US 12,132,706 B2

(12) United States Patent
Chen

(10) Patent No.: US 12,132,706 B2
(45) Date of Patent: Oct. 29, 2024

(54) DATA COLLECTION SYSTEM FOR EFFECTIVELY PROCESSING BIG DATA

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 494 days.

(21) Appl. No.: 17/692,214

(22) Filed: Mar. 11, 2022

(65) Prior Publication Data
US 2022/0200959 A1 Jun. 23, 2022

Related U.S. Application Data

(63) Continuation-in-part of application No. 16/655,742, filed on Oct. 17, 2019, now abandoned.

(30) Foreign Application Priority Data

Aug. 30, 2019 (TW) ................................ 108131430

(51) Int. Cl.
*H04L 9/40* (2022.01)
*G06F 16/951* (2019.01)

(52) U.S. Cl.
CPC ........ *H04L 63/0254* (2013.01); *G06F 16/951* (2019.01); *H04L 63/1441* (2013.01)

(58) Field of Classification Search
CPC ....................... H04L 63/0254; H04L 63/1441; G06F 16/951
USPC ......................................................... 707/754
See application file for complete search history.

(56) References Cited

U.S. PATENT DOCUMENTS

| | | | |
|---|---|---|---|
| 8,407,789 B1 | 3/2013 | Mears | |
| 10,291,635 B2* | 5/2019 | Muddu | ................... H04L 63/06 |
| 2018/0167402 A1* | 6/2018 | Scheidler | ............... G06N 20/00 |
| 2018/0219888 A1* | 8/2018 | Apostolopoulos | .... G06F 21/554 |
| 2018/0316695 A1* | 11/2018 | Esman | ............... G06Q 20/4016 |

FOREIGN PATENT DOCUMENTS

CN           102790706 A     11/2012

OTHER PUBLICATIONS

Farooq, Hafiz M., et al., "Optimal Machine Learning Algorithms for Cyber Threat Detection", UKSim 2018, Cambridge, UK, Mar. 27-29, 2018, pp. 32-37.*
Jaiswal, Jitendra Kumar, et al., "A Survey on Contemporary Security threats in Big Data and Information System", ICRTCCM 2017, Tindivanam, India, Feb. 3-4, 2017, pp. 263-268.*

* cited by examiner

*Primary Examiner* — Robert Stevens

(57) ABSTRACT

Data collection system for effectively processing big data is provided. The data collection system includes multiple risk filtering modules up to third order or higher and a specific data extractor, wherein the multiple risk filtering modules and the specific data extractor are connected in series. The data collection system is capable of filtering received raw data through the multiple risk filtering modules so as to remove data with cyber security risks or system security issues, and keeping required data by the specific data extractor. In addition, the system can assist the user automatically to carefully select raw data through a combination of means of data classification, data normalization, and data clustering analysis. Thereby the system effectively enhances usability and security of data collection.

23 Claims, 9 Drawing Sheets

DATA COLLECTION SYSTEM FOR EFFECTIVELY PROCESSING BIG DATA

CROSS-REFERENCE TO RELATED APPLICATION

This application is a continuation-in-part patent application of U.S. application Ser. No. 16/655,742 filed on Oct. 17, 2019, the entire contents of which are hereby incorporated by reference for which priority is claimed under 35 U.S.C. § 120. The U.S. application Ser. No. 16/655,742 claims priority under 35 U.S.C. § 119(a) on Patent Application No. 108131430 filed in Taiwan, R.O.C. on Aug. 30, 2019, the entire contents of which are hereby incorporated by reference.

BACKGROUND OF THE INVENTION

1. Field of the Invention

The invention relates to a data collection system, and particularly to a data collection system for effectively processing big data.

2. Description of the Related Art

With the rapid expansion of the Internet, it is full of various sources of information (various websites and web pages), and as the number of websites and web pages increases, the amount of data existing on the Internet also grows faster than expected. Accordingly, collection tools for extracting materials from big data have been produced.

Currently, most of the collection tools for specific big data adopt filtering methods with keywords or combination of rules. For the data collection systems, required to extract desired results from the exploding amounts of data of the information sources, there are issues of a large amount of computational resource consumption, or of the filtering results with mutual interference due to excessive rules or keywords. In addition, it is easy for the traditional filtering methods with keywords or rules to collect a lot of malicious data or data out of the usable extents. Such situations not only consume computing resources in vain, but also cause information security risks.

Thus, it is desirable to have improvement on the collection tools of the conventional art.

BRIEF SUMMARY OF THE INVENTION

In view of the above-mentioned deficiency of the conventional art, an objective of the present invention is to provide a data collection system that effectively processes big data, which is not only capable of selecting required raw data from received raw data, but also filtering out the raw data based on different properties and security concerns (such as cyber security risks or system security issues). Accordingly, the system can assist the user to automatically and carefully select raw data through a combination of means of data classification, data normalization, and data clustering analysis, so as to effectively enhance usability and security of data collection.

In order to achieve the above objective and more, the data collection system is implemented by a system device including a communication module, a processor, a computer-readable storage medium, an input module, and an output module; wherein the communication module is implemented by a communication circuit at least compliant with a serial port protocol (such as RS232) and a wireless communication protocol (such as 5G-NR); wherein the computer-readable storage medium is implemented by a non-volatile memory (such as a flash memory); wherein the input module is capable of receiving or setting an instruction to configure the data collection system; wherein the output module coupling to a display device is utilized to output an integrated report; based on the implementation of the system device, the data collection system performing operations comprising:

a) utilizing a first-order risk filtering module to receive a raw data including contents in types of text, image, video or executable scripts from remote sources and remove risky data according to a user's configuration for high-level threats with specific cyber security risks, wherein the remote sources comprise external websites and webpages on remote hosts;

b) utilizing a second-order risk filtering module to remove risky data and undesirable data according to a user's configuration for medium-level threats with specific system security issues;

c) utilizing a specific data extractor to get required data via performing data extracting processes on a received data; and d) utilizing a third-order risk filtering module to remove raw data related to data leaks occurred with wireless transmissions;

wherein the first-order risk filtering module, the specific data extractor, the second-order risk filtering module and the third-order risk filtering module are connected in series, so as to obtain collected data for data characterizing processes, wherein the data characterizing processes include data clustering analysis and principal component analysis, thereby the data collection system outputs usable raw data without blocking data or a data stream.

The data collection system according to the invention is capable of filtering received raw data through the first-order and second-order risk filtering modules so as to remove raw data which is undesirable or has risks such as cyber security risks or system security issues, and obtaining required data by the specific data extractor. Accordingly, the system can assist the user to automatically and carefully select the received raw data through a combination of means of data classification, data normalization, and data clustering analysis, so as to achieve the advantage of effective enhancement on usability and security of data collection.

In an embodiment of the present invention the data collection system for effectively processing big data comprises: a communication module; a processor; a computer-readable storage medium; an input module, and an output module; wherein the communication module is implemented by a communication circuit at least compliant with a serial port protocol and a wireless communication protocol; wherein the computer-readable storage medium is implemented by a non-volatile memory; wherein the input module is capable of receiving or setting an instruction to configure the data collection system; wherein the output module coupling to a display device is utilized to output an integrated report; based on the implementation of the system device; and wherein the data collection system performs operations comprising; utilizing a first-order risk filtering module to receive a raw data including contents in types of text, image, video or executable scripts from remote sources and remove risky data according to a user's configuration for high-level threats with specific cyber security risks, wherein the remote sources comprise external websites and webpages on remote hosts; utilizing a second-order risk filtering module to remove risky data and undesirable data according to a user's configuration for medium-level threats with specific system security issues; utilizing a specific data extractor to get required data via performing data extracting processes on a received data; utilizing a third-order risk filtering module to remove raw data related to man-in-middle behaviors; and utilizing the third-order risk filtering module to remove raw data related to data leaks; wherein the first-order risk filtering module, the specific data extractor, the second-order risk filtering module and the third-order risk filtering module are connected in series, so as to obtain collected data for data characterizing processes, wherein the data characterizing processes include data clustering analysis and principal component analysis, thereby the data collection system outputs usable raw data without blocking a data or a data stream.

DETAILED DESCRIPTION OF THE INVENTION

To facilitate understanding of the object, characteristics and effects of this present disclosure, embodiments together with the attached drawings for the detailed description of the present disclosure are provided.

Figure 1:
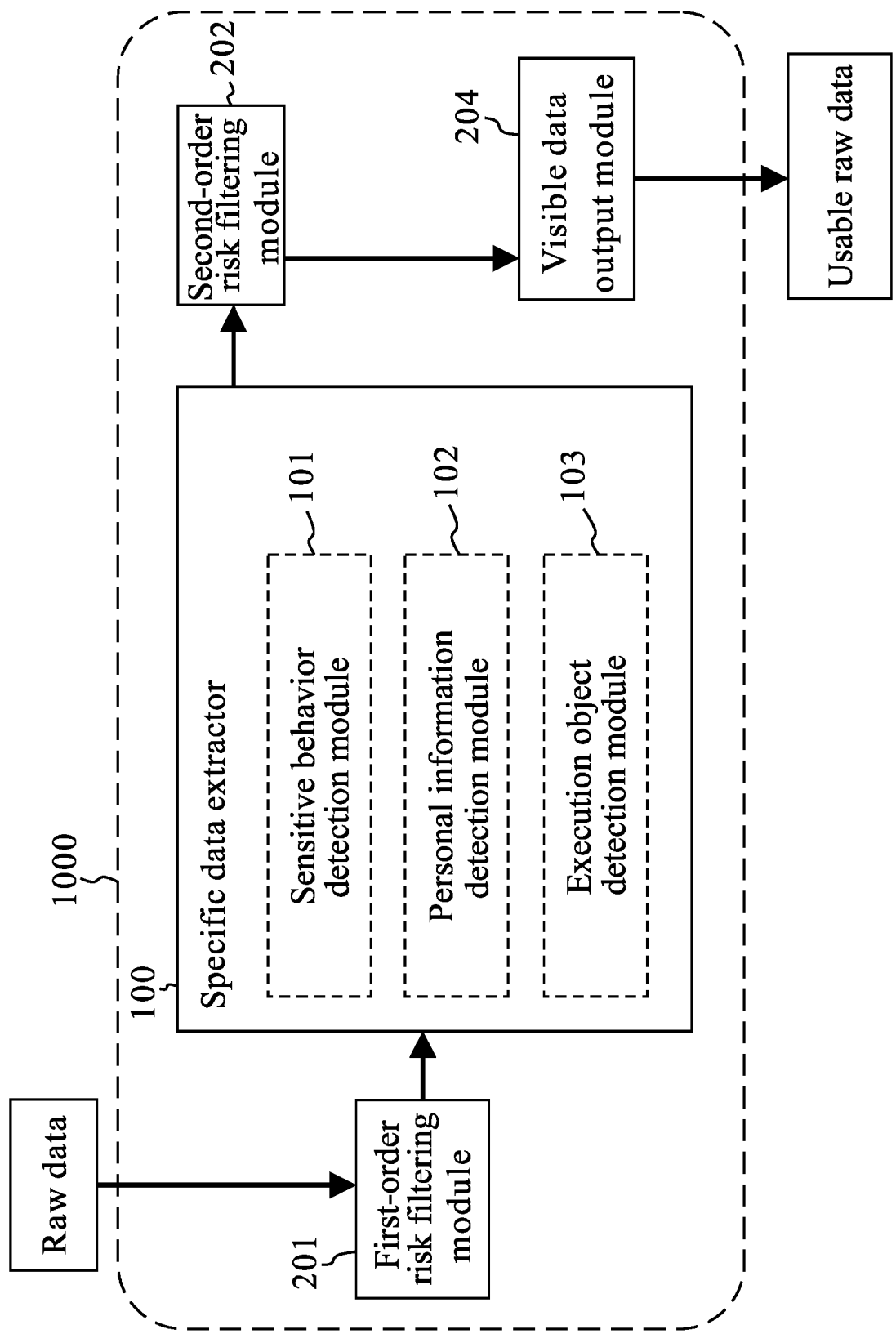
FIG. 1 is a schematic architecture diagram illustrating a first preferred embodiment of a data collection system according to an embodiment of the present invention.
Figure 2:
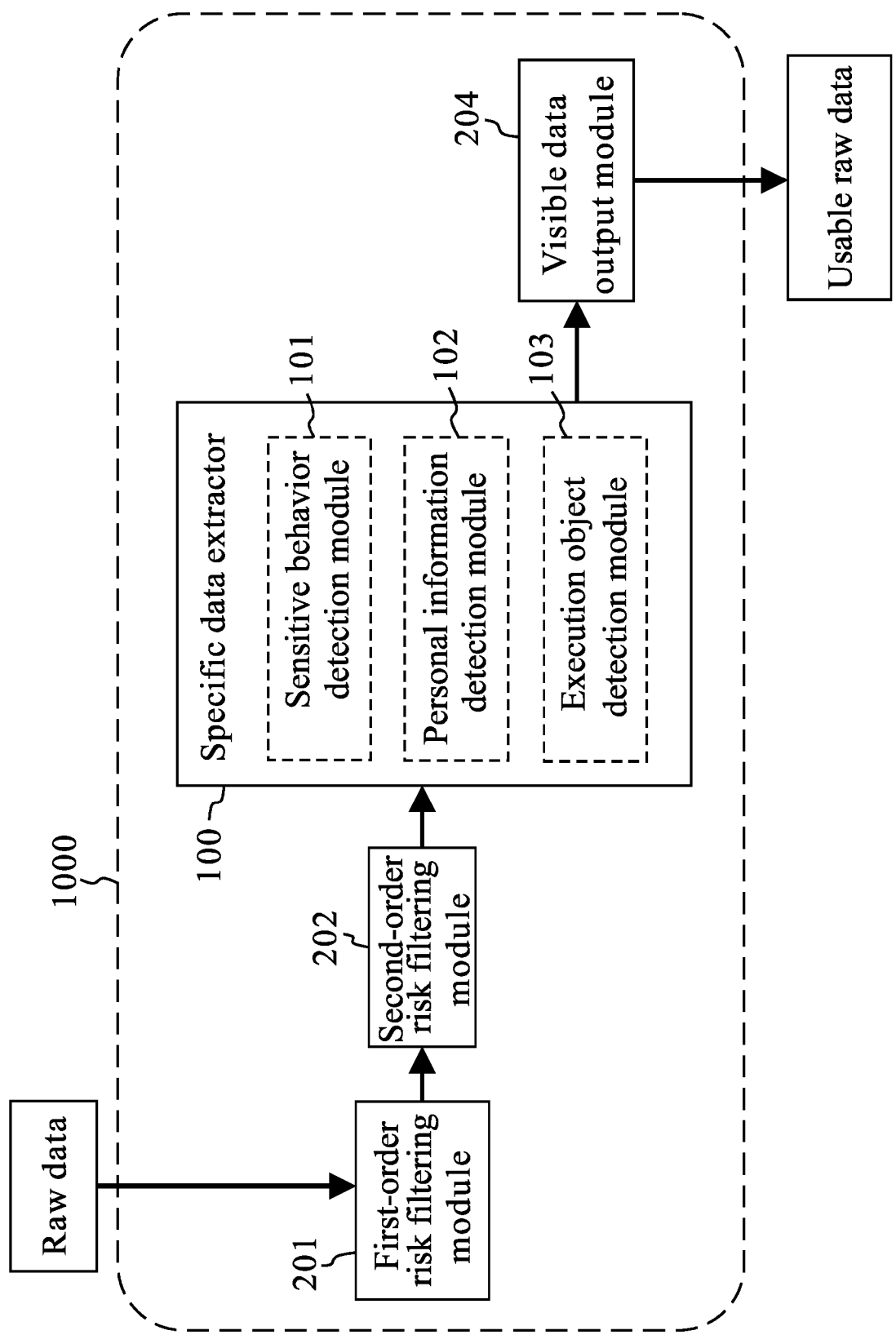
FIG. 2 is a schematic architecture diagram illustrating a second preferred embodiment of the data collection system according to an embodiment of the present invention.

Referring to FIG. 1, a data collection system for effectively processing big data is illustrated according to a preferred embodiment of the invention. As shown in FIG. 1, the data collection system 1000 comprises a specific data extractor 100, a first-order risk filtering module 201, and a second-order risk filtering module 202. The specific data extractor 100, the first-order risk filtering module 201, and the second-order risk filtering module 202 are connected in series through applicable connecting orders, for example, in this embodiment, in the order of the first-order risk filtering module 201, the specific data extractor 100, the second-order risk filtering module 202 sequentially (in the order of 201-100-202). In a preferred embodiment, the specific data extractor 100, the first-order risk filtering module 201, and the second-order risk filtering module 202 can be connected in the order of the first-order risk filtering module 201, the second-order risk filtering module 202, the specific data extractor 100 sequentially (in the order of 201-202-100, as shown in FIG. 2). In another preferred embodiment, the second-order risk filtering module 202 may be connected before the first-order risk filtering module 201, and the invention is not limited thereto. By the way, the term "risk" discussed in this disclosure mainly means cyber security risk or system security issues in the aspect of data accessing.

The first-order risk filtering module 201 is utilized for receiving raw data from remote sources (such as websites and webpages on remote web servers, network attached storages, content distribution networks, cloud disks, shared folders, P2P over Ad-Hoc, and so on), and filtering and/or screening the received raw data, initially filtering the received raw data with configured high-level threats related to specific cyber security risks so as to prevent the data collection system 1000 from generating security vulnerability. Here the operation of filtering means to remove some data in condition of some term(s), for example, according to some label(s) derived via data clustering analysis; and the operation of screening means to get some data in condition of some term(s), for example, according to some label(s) derived via data clustering analysis. The raw data may include a plurality of contents (such as text, video, images, executable objects, or so on) from one or more remote hosts, and the invention is not limited thereto.

The specific data extractor 100 receives the data output by the first-order risk filtering module 201, and further keeps/removes or labels the received data after performing data extracting processes. In the present preferred embodiment, the specific data extractor 100 includes a sensitive behavior detection module 101, a personal information detection module 102, and an execution object detection module 103. In this embodiment, the data collection system 1000 utilizes the specific data extractor 100 for performing data extracting processes comprising: a) to drive a sensitive behavior detection module 101 to trigger a subroutine when finding some cookie received with a frequency higher than a configured threshold so as to extract the received data directly associated with sensitive behavior, thereby getting required data; b) to drive a personal information detection module 102 to trigger a subroutine for extracting the received data directly associated with personal information, such as user accounts, email address book or so on, so as to get required data; and c) to drive an execution object detection module 103 to trigger a subroutine for extracting the received data wherein the received data can facilitate launching a process in an operating system, such as EXE files, Java Script or so on.

In an embodiment, the above-mentioned sensitive behavior detection module 101 further focuses on getting required data, which relates to online survey on private questions comprising sexual attitudes, political leanings, or shopping habits, through implementing website lists additionally. Moreover, in order to facilitate extracting the received data directly associated with user accounts, the above-mentioned personal information detection module 102 further implements a subroutine on monitoring header of sign-on/login protocols.

The second-order risk filtering module 202 filters the received data, so as to remove risky data and undesirable data according to configured medium-level threats related to specific system security issues.

Referring to FIG. 2, hence, the data collection system 1000 is capable of filtering the received raw data through multiple risk filtering modules up to second order or higher (e.g., the first-order and second-order risk filtering modules 201~202) so as to remove the received raw data which is undesirable or has risks such as cyber security risks or systems security issues, and obtaining required data by the specific data extractor 100. Further, the data collection system 1000 can assist the user automatically to carefully select received raw data via utilizing a visible data output module 204 through a combination of means of data classification, data normalization, and data clustering analysis, thereby achieving the advantage of effective enhancement on usability and security of data collection.

In the present preferred embodiment, the data collection system 1000 further includes a visible data output module 204, which receives the collected data resulted from the filtering of the risk filtering modules 201~202 and the extracting of the specific data extractor 100, and generates an integrated report after performing data classification, data normalization, data regression analysis, principal component analysis, data clustering analysis, and visualization outputting on the collected data. In this manner, the user can quickly and clearly obtain analysis results of the received raw data with practical value.

Figure 3:
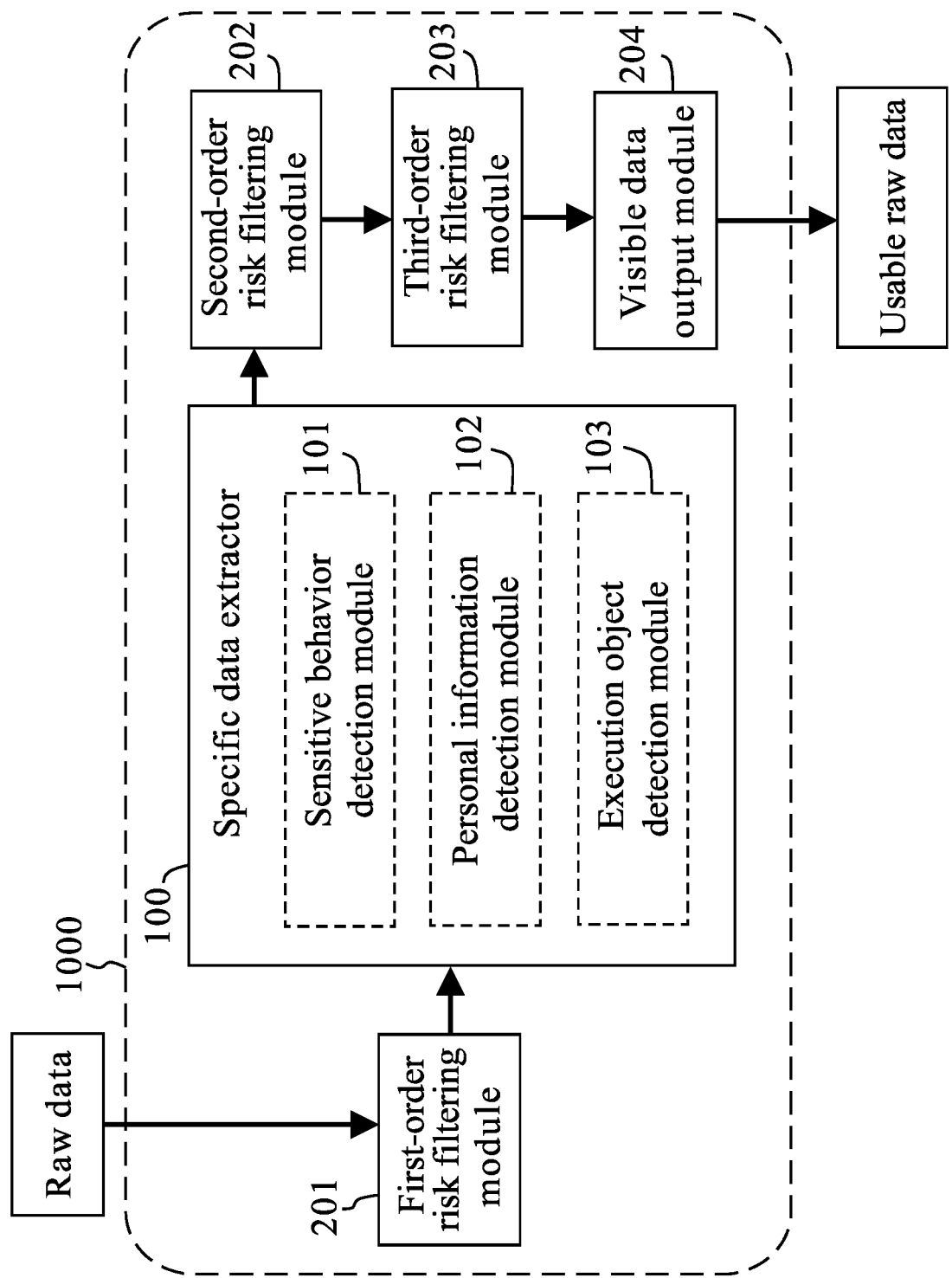
FIG. 3 is a schematic architecture diagram illustrating a third preferred embodiment of the data collection system according to an embodiment of the present invention.

In the present preferred embodiment, the data collection system 1000 further includes a third-order risk filtering module 203. Referring to FIG. 3, the third-order risk filtering module 203 can be configured to be between the second-order risk filtering module 202 and the visible data output module 204 (in the connecting order of 202-203-204). The third-order risk filtering module 203 is especially utilized for filtering raw data received through a wireless path (such as Wi-Fi or 5G-NR) so as to remove raw data which is related to data leaks occurred with wireless transmissions, and outputs the filtered raw data to the visible data output module 204 so as to effectively improve the usability of the filtered raw data.

Figure 4:
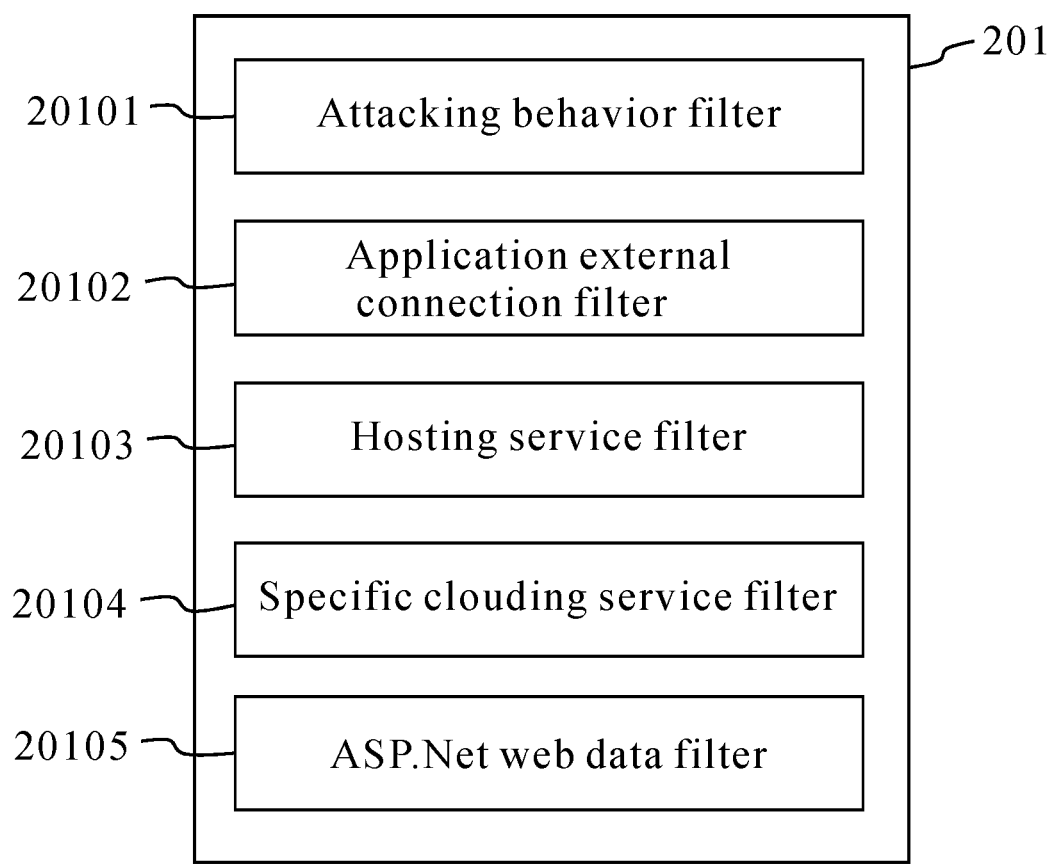
FIG. 4 is a schematic architecture diagram illustrating a preferred embodiment of a first-order risk filtering module according to an embodiment of the present invention.

Referring to FIG. 4, the first-order risk filtering module 201 of the preferred embodiment is illustrated for the sake of description. As shown in FIG. 4, the first-order risk filtering module 201 further includes an attacking behavior filter 20101, an application external connection filter 20102, a hosting service filter 20103, a specific clouding service filter 20104 and an ASP.Net web data filter 20105.

The attacking behavior filter 20101 is employed to filter the raw data with web-aspect attacking behavior, so as to prevent the data collection system 1000 from deriving cyber security vulnerabilities, wherein the web-aspect attacking behavior may be, for example, a web injection attack, a cross-site scripting (XSS) attack or so on. The application external connection filter 20102 is utilized to filter the raw data related to application programs binding specific external connections so as to prevent internal data from being maliciously transmitted to external devices and causing security vulnerability of the data collection system 1000. The hosting service filter 20103 is used to filter the data packets of the raw data belonging to a specific hosting service. The specific clouding service filter 20104 is utilized for filtering data packets of the raw data related to a specific clouding service implemented by Java Applet, so as to avoid the security vulnerability of the specific clouding service causing security vulnerability of the data collection system 1000. The ASP.Net web data filter 20105 is employed to filter the raw data regarding specific webpage data implemented using ASP.Net. In this way, the first-order risk filtering module 201 is capable of filtering out the raw data with security concerns, thus not only protecting the data collection system 1000, but also effectively extracting the usable raw data. In other words, the above filters 20101~20105 driven by the first-order risk filtering module 201 which is utilized by the data collection system 1000 can be filtering processes with software logics comprising the following operations: a) removing risky data associated with a web-aspect attacking behavior; b) removing risky data associated with an application external connection; c) removing risky data associated with a hosting service; d) removing risky data associated with a specific clouding service; and e) removing risky data associated with an ASP.Net web data.

Figure 5:
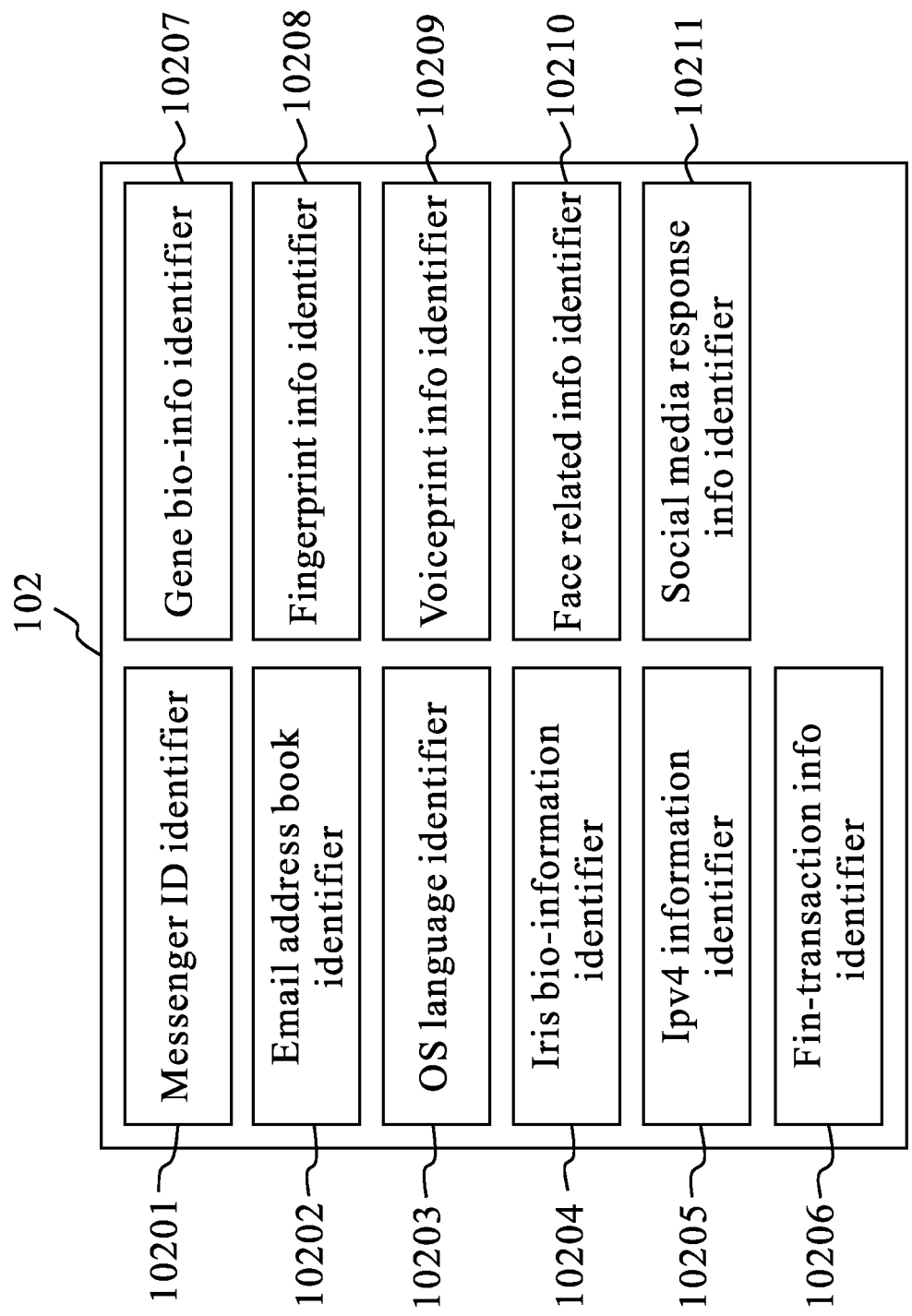
FIG. 5 is a schematic architecture diagram illustrating a preferred embodiment of a personal information detection module according to an embodiment of the present invention.

Referring to FIG. 5, the personal information detection module 102 of the preferred embodiment is illustrated for the sake of description. As shown in FIG. 5, the personal information detection module 102 further includes a messenger ID identifier 10201, an email address book identifier 10202, an OS language identifier 10203, an iris bio-information identifier 10204, an IPv4 information identifier 10205, a fin-transaction info identifier 10206, a gene bio-info identifier 10207, a fingerprint info identifier 10208, a voiceprint info identifier 10209, a face related info identifier 10210, and a social media response info identifier 10211. In other words, the above identifiers 10201~10211 triggered by the personal information detection module 102 which is driven by the data collection system 1000 can be a subroutine with software logics comprising the following means: identifying a messenger ID; identifying an email address book; identifying an OS language; identifying an iris bio-information; identifying an IPv4 information; identifying a fin-transaction info; identifying a gene bio-info; identifying a fingerprint info; identifying a voiceprint info; identifying a face related info; and identifying a social media response info.

The messenger ID identifier 10201 is used to identify and extract the raw data related to user accounts of communication software (e.g., LINE). The email address book identifier 10202 is used to identify the raw data related to an email address book. The OS language identifier 10203 is used to identify the language of the operating system of the source of the raw data. The iris bio-information identifier 10204 is used to identify the raw data related to biological information of iris. The IPv4 information identifier 10205 is used to identify the IPv4 information of the device of the data source of the raw data. The fin-transaction info identifier 10206 is used to identify the raw data related to financial transaction. The gene bio-info identifier 10207 is used to identify the raw data related to biological information of genes. The fingerprint info identifier 10208 is used to identify the raw data related to biological information of fingerprints. The voiceprint info identifier 10209 is used to identify the raw data related to biological information of voiceprints. The face related info identifier 10210 is used to identify the raw data related to biological information of faces. The social media response info identifier 10211 is used to identify the raw data related to return data from social media (e.g., FaceBook). In this manner, the personal information detection module 102 can quickly and accurately extract the raw data associated with personal information and being usable so as to improve the efficiency of data collection processing, thus enhancing the convenience and usability of data collection.

Figure 6:
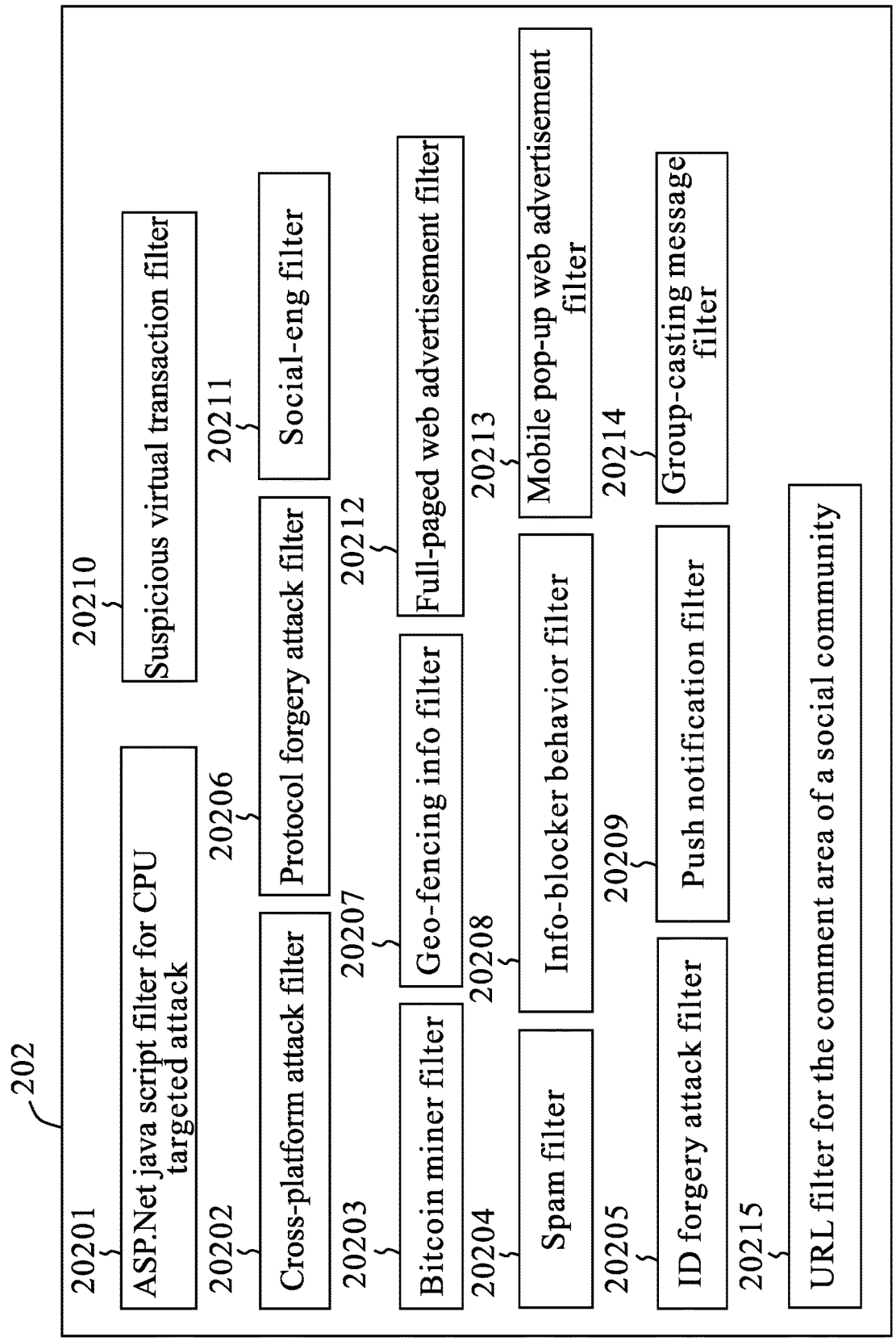
FIG. 6 is a schematic architecture diagram illustrating a preferred embodiment of a second-order risk filtering module according to an embodiment of the present invention.

Referring to FIG. 6, the second-order risk filtering module 202 of the preferred embodiment is illustrated for the sake of description. As shown in FIG. 6, the second-order risk filtering module 202 further includes an ASP.Net java script filter 20201 for CPU targeted attack, a cross-platform attack filter 20202, a bitcoin miner filter 20203, a spam filter 20204, an ID forgery attack filter 20205, a protocol forgery attack filter 20206, a geo-fencing info filter 20207, an info-blocker behavior filter 20208, a push notification filter 20209, a suspicious virtual transaction filter 20210, a social-eng filter 20211, a full-paged web advertisement filter 20212, a mobile pop-up web advertisement filter 20213, a group-casting message filter 20214, and a URL filter 20215 for the comment area of a social community.

The ASP.Net java script filter 20201 for CPU targeted attack filters the raw data related to a JavaScript for attacking a CPU as an attack target, to prevent internal information of the data collection system 1000 from being stolen, causing security vulnerability of the data collection system 1000. The cross-platform attack filter 20202 filters the raw data related to a cross-platform attack, for example, a remote Trojan program, to avoid the theft of control authority for the control data collection system 1000, causing security vulnerability of the data collection system 1000. The bitcoin miner filter 20203 is capable of filtering, but not limited to, the raw data related to a bitcoin miner (also known as crypto miners) script hidden in a webpage, to avoid unauthorized malicious access to computational resources of the data collection system 1000, causing additional resource consumption of the data collection system 1000. The spam filter 20204 is utilized for filtering spam in a data stream, for example, advertising emails, to reduce the computational burden of the data collection system 1000 and improve the usability of the filtered raw data. The ID forgery attack filter 20205 filters the raw data related to an ID forgery attack. The protocol forgery attack filter 20206 filters the raw data related to a protocol forgery attack. The geo-fencing info filter 20207 filters the raw data related to geographical fencing information. The info-blocker behavior filter 20208 filters the raw data related to a data stream for performing information blocker, to prevent the data collection system 1000 from collecting incorrect raw data, thus reducing the resource consumption of the data collection system 1000. The push notification filter 20209 filters the raw data transmitted by a push notification server, to prevent the data collection system 1000 from collecting undesirable raw data, thus reducing the resource consumption of the data collection system 1000. The suspicious virtual transaction filter 20210 is employed to filter the raw data related to suspicious virtual transaction, to prevent the data collection system 1000 from collecting undesirable or incorrect raw data, for example, raw data related to illegal behavior, thus reducing the resource consumption of the data collection system 1000. The social-eng filter 20211 filters the raw data belonging to social engineering, to prevent the data collection system 1000 from collecting undesirable or incorrect raw data, for example, raw data related to fraudulent behavior, thus reducing the resource consumption of the data collection system 1000. The full-paged web advertisement filter 20212 is utilized for filtering, but not limited to, the raw data related to a pop-up full-page web advertisement, thus reducing the resource consumption of the data collection system 1000. The mobile pop-up web advertisement filter 20213 is intended for filtering the raw data belonging to a pop-up advertisement of a mobile phone, thus reducing the resource consumption of the data collection system 1000. The group-casting message filter 20214 is intended for filtering the raw data related to group messages sent by communication software (e.g., Line@). Since the group messages sent by communication software are usually advertisement or promotional messages, the group-casting message filter 20214 can be employed to prevent the data collection system 1000 from collecting undesirable or incorrect raw data, thus reducing the resource consumption of the data collection system 1000. The URL filter 20215 for the comment area of a social community is intended for filtering the raw data related to uniform resource locators (URL) posted in a comment area of a social community, to prevent the data collection system 1000 from collecting undesirable or incorrect raw data, thus reducing the resource consumption of the data collection system 1000. In other words, the above filters 20201~20215 driven by the second-order risk filtering module 202 which is utilized by the data collection system 1000 can be filtering processes with software logics comprising the following operations for system security issues: removing risky data associated with an ASP.Net java script for CPU targeted attack; removing risky data associated with a cross-platform attack; removing undesirable data associated with a bitcoin miner (also known as crypto miners); removing undesirable data associated with a spam; removing risky data associated with an ID forgery attack; removing risky data associated with a protocol forgery attack; removing undesirable data associated with a geo-fencing information; removing undesirable data associated with an info-blocker behavior; removing undesirable data associated with a push notification; removing undesirable data associated with a suspicious virtual transaction; removing risky data associated with a social engineering; removing undesirable data associated with a full-paged web advertisement; removing undesirable data associated with a mobile pop-up web advertisement; removing undesirable data associated with a group-casting message; and removing risky data associated with a URL attached on the comment area of a social community.

Figure 7:
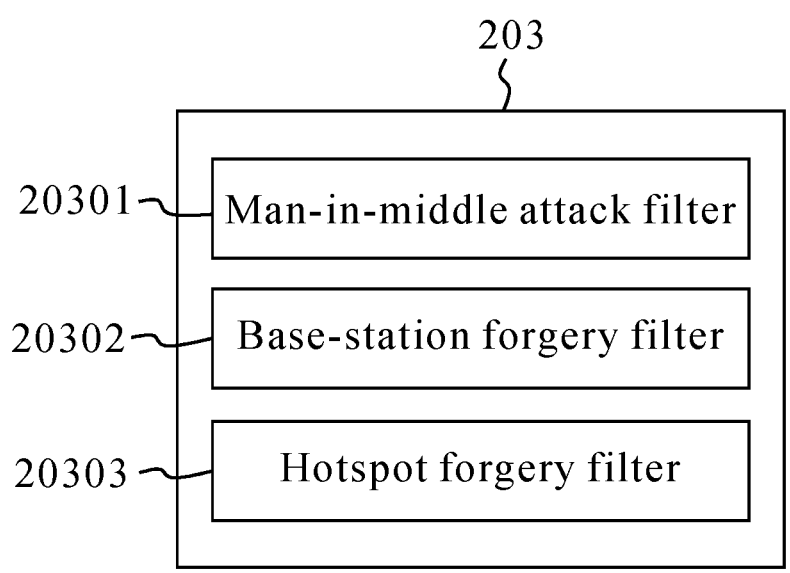
FIG. 7 is a schematic architecture diagram illustrating a preferred embodiment of a third-order risk filtering module according to an embodiment of the present invention.

Referring to FIG. 7, the third-order risk filtering module 203 of the preferred embodiment is illustrated for the sake of description. As shown in FIG. 7, the third-order risk filtering module 203 further includes a man-in-middle attack filter 20301, a base-station forgery filter 20302 and a hotspot forgery filter 20303. The data collection system 1000 can utilize the third-order risk filtering module 203 to perform the following filtering processes for raw data related to data leaks occurred with wireless transmissions: a) to drive the man-in-middle attack filter 20301 for removing risky data associated with packets used by a man-in-middle attack; b) to drive the base-station forgery filter 20302 for removing risky data associated with packets sent by a base-station forgery; and c) to drive the hotspot forgery filter 20303 for removing risky data associated with packets sent by a hotspot forgery. Thus, the data collection system 1000 is prevented from collecting undesirable or incorrect raw data, thus reducing the resource consumption of the data collection system 1000.

Figure 8:
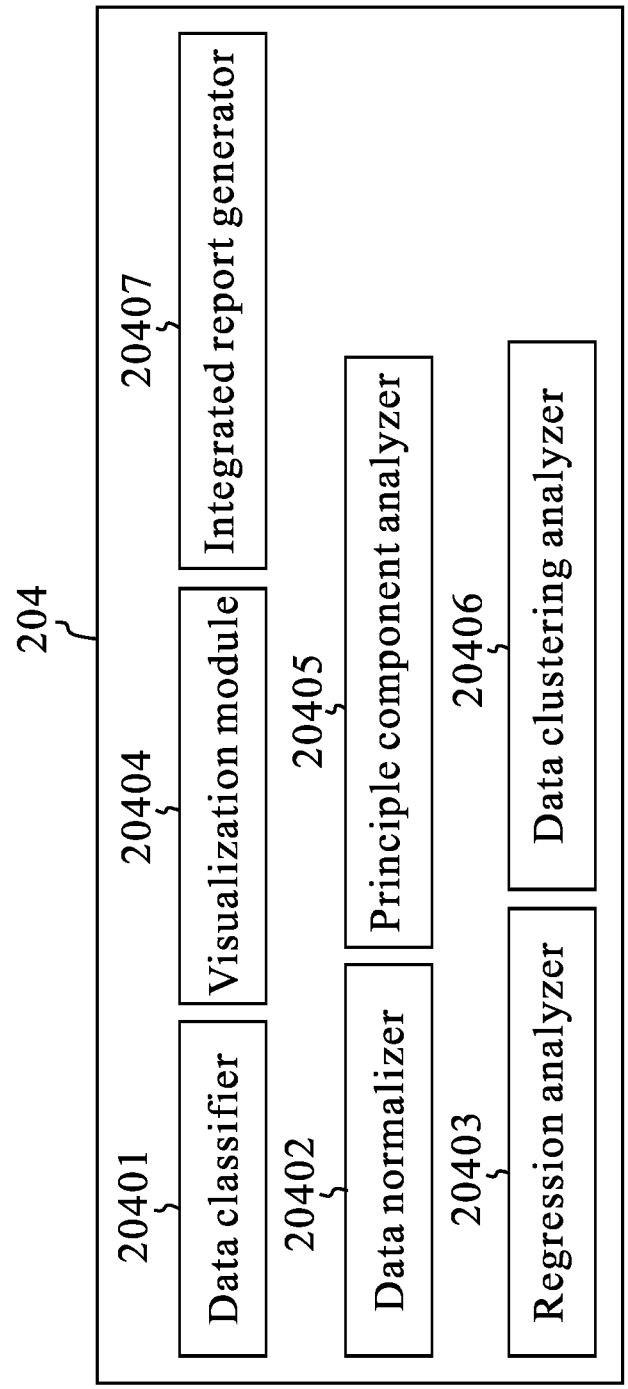
FIG. 8 is a schematic architecture diagram illustrating a preferred embodiment of a visible data output module according to an embodiment of the present invention.

Referring to FIG. 8, the visible data output module 204 of the preferred embodiment is illustrated for the sake of description. As shown in FIG. 8, the visible data output module 204 is for performing data characterizing processes on the collected data to come out visible data associated with the collected data and related analyzed results, and then generates an integrated visualization report according to the visible data; wherein the module 204 further includes: a data classifier 20401, a data normalizer 20402, a regression analyzer 20403, a visualization module 20404, a principal components analyzer 20405, a data clustering analyzer 20406, and an integrated report generator 20407. Referring to FIG. 3 and FIG. 8, the data collection system 1000 can utilize a visible data output module 204 comprising the elements 20401~20407 to perform the following data characterizing processes: a) to drive the data classifier 20401 for performing data classification analysis to classify the collected data according to user's configuration so as to derive a classified data; b) to drive the data normalizer 20402 for performing a data normalization process on the classified data to reduce data redundancy, enhance data consistency, and derive a normalized data; c) to drive the regression analyzer 20403 for performing data regression analysis on the normalized data so as to estimate a relationship between the outcome variable of the collected data and the features of the collected data; d) to drive the visualization module 20404 for deriving visualization output, such as generating charts, based on the data which is processed by 20401~20403; e) to drive the principal component analyzer 20405 for performing principal component analysis (PCA) on the collected data so as to facilitate deriving predictive models; f) to drive the data clustering analyzer 20406 for performing data clustering analysis on the collected data according to various algorithms to determine whether there is a certain cluster distribution; and g) to drive the integrated report generator 20407 for generating a report which integrates derived information based on the collected data, the results of at least one of the above analyses, and the visualization output. Besides providing analyzed results to the integrated report generator 20407, the data clustering analyzer 20406 facilitates the operation of data detection, data identification, data extraction, and data removing for the data collection system 1000 as well.

In an embodiment, in order to facilitate the above-mentioned data classifier 20401 to derive a classified data, the user's configuration further comprises the following options for the data classification analysis which is performed by the data classifier 20401: a) analyzing with decision-tree models; b) analyzing with support vector machines; and c) analyzing with TDA (topological based data analysis) approaches introducing Wasserstein Distance for obtaining a reference similarity between two data sets or data classes. Accordingly, the data classifier 20401 disclosed by the present invention is capable of not only classifying conventional data in efficiency but also dealing with some unusual or rare data sets through a reasonable practice. This is an effect that cannot be achieved by prior arts.

In an embodiment, in order to facilitate reducing data redundancy, enhancing data consistency and deriving a normalized data, the data normalization process performed by the above-mentioned data normalizer 20402 further comprises the following operations: a) tagging a representative label to the classified data and the data of the same class should be tagged with the same representative label; b) counting the probability of occurrence for each representative label; and c) dynamically setting up a data weight for each representative label based on its probability of occurrence.

In an embodiment, in order to facilitate the above-mentioned data clustering analyzer 20406 to determine whether there is a certain cluster distribution with the collected data, the data clustering analysis which is performed by the data clustering analyzer 20406 further supports the following operations: a) analyzing with a k-means clustering utility; b) analyzing with a quality-threshold clustering utility; and c) analyzing with a Fuzzy C-Means clustering utility. In some cases, especially for those data sets in high dimension (for example: with many parameters or properties) with unrecognizable outliers, when the above clustering operations a)~c) cannot help on determining a cluster very well, the data clustering analyzer 20406 will introduce a connectivity-based method (such as COF, Connectivity-Based Outlier Factor) for discarding some possible outliers; and utilize a subspace clustering utility (such as density conscious subspace clustering, grid-based subspace clustering, or so on) to find some possible clusters in lower dimensions. Accordingly, the data clustering analyzer 20406 disclosed by the present invention is capable of not only determining a cluster distribution for conventional data in efficiency but also facilitating edge computing applications to deal with high dimensional big data through a reasonable practice. This is an effect that cannot be achieved by prior arts.

Figure 9:
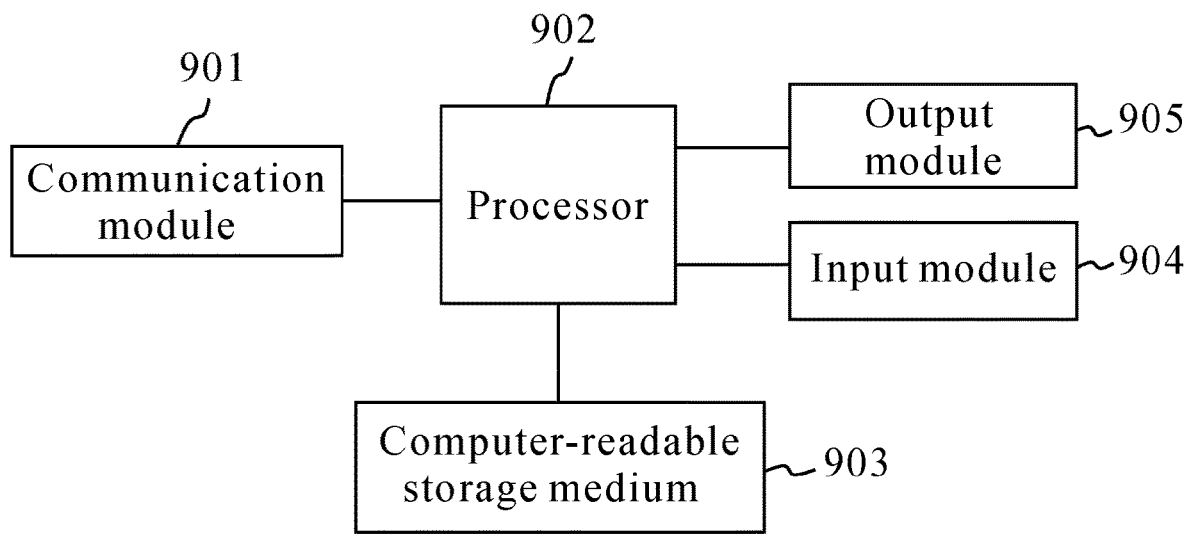
FIG. 9 is a schematic architecture diagram illustrating a preferred embodiment of a system device according to an embodiment of the present invention.

In the present preferred embodiment, the data collection system 1000 may be implemented by a system device, such as, an embedded system device platform, a user computer or a server host or so on. In another embodiment, the data collection system 1000 may be implemented by a cloud server; and the invention is not limited to the above examples. Referring to FIG. 9, a system device 2000 for the preferred embodiment is illustrated. As shown in FIG. 9, the system device 2000 at least includes a communication module 901, a processor 902, a computer-readable storage medium 903, an input module 904, and an output module 905, wherein the processor 902 and the communication module 901, the computer-readable storage medium 903, the output module 905, and the input module 904 are connected electrically. The communication module 901 is utilized to receive the raw data from external websites or webpages applied on remote hosts; wherein the communication module 901 is implemented by a communication circuit compliant with a serial port protocol (such as RS232), a wireless communication protocol (such as 5G-NR) and other transmission protocol; and the invention is not limited to the above examples. The computer-readable storage medium 903 can store at least one program to be loaded for performing the data collection system 1000, and may be implemented by a non-volatile memory such as a flash memory; and the invention is not limited thereto. The processor 902 is employed to read and execute the stored program, and can be implemented by one or more processors. The input module 904 is capable of receiving setting or an instruction inputted by a user using an external input device (e.g., mouse, keyboard, touch monitor or so on) to configure the data collection system 1000 correspondingly. The output module 905 is utilized to output the integrated report generated by the execution of the program to a display device. In this manner, the user can view the usable raw data conveniently and readily through the integrated report shown by the display device.

To sum up, the data collection system 1000 according to the invention as exemplified and described above is capable of automatically filtering received raw data through multiple risk filtering modules up to third order or higher (e.g., the first-order, second-order, and third-order risk filtering modules; as 201~203 shown in FIG. 3) so as to remove the data which is undesirable or has risks such as cyber security risks, system security issues, or data leaks with wireless transmissions; and is also capable of keeping/removing or labeling required data through a specific data extractor 100 and a visible data output module 204; wherein, the visible data output module 204 of the data collection system 1000 can quickly and safely assist the user to carefully select the received raw data through a combination of means of data classification, data normalization, and data clustering analysis. Accordingly, the data collection system 1000 achieves the advantage of effective enhancement on usability and security of data collection.

While the present disclosure has been described by means of specific embodiments, numerous modifications and variations could be made thereto by those skilled in the art without departing from the scope and spirit of the present disclosure set forth in the claims.

What is claimed is:

1. A data collection system for effectively processing big data, wherein the data collection system is implemented by a system device including a communication module, a processor, a computer-readable storage medium, an input module, and an output module; wherein the communication module is implemented by a communication circuit at least compliant with a serial port protocol and a wireless communication protocol; wherein the computer-readable storage medium is implemented by a non-volatile memory; wherein the input module is capable of receiving or setting an instruction to configure the data collection system; wherein the output module coupling to a display device is utilized to output an integrated report; based on the implementation of the system device, the data collection system performing operations comprising:
   a) utilizing a first-order risk filtering module to receive a raw data including contents in types of text, image, video or executable scripts from remote sources and remove risky data according to a user's configuration for high-level threats with specific cyber security risks, wherein the remote sources comprise external websites and webpages on remote hosts;
   b) utilizing a second-order risk filtering module to remove risky data and undesirable data according to a user's configuration for medium-level threats with specific system security issues;
   c) utilizing a specific data extractor to get required data via performing data extracting processes on a received data;
   d) utilizing a third-order risk filtering module to remove raw data related to man-in-middle behaviors; and
   e) utilizing the third-order risk filtering module to remove raw data related to data leaks;
      wherein the first-order risk filtering module, the specific data extractor, the second-order risk filtering module and the third-order risk filtering module are connected in series, so as to obtain collected data for data characterizing processes, wherein the data characterizing processes include data clustering analysis and principal component analysis, thereby the data collection system outputs usable raw data without blocking a data or a data stream.

2. The data collection system according to claim 1, wherein the data extracting processes performed by the specific data extractor further comprise:
   a) driving a sensitive behavior detection module to trigger a subroutine when finding some cookie received with a frequency higher than a configured threshold for extracting the received data directly associated with sensitive behavior, so as to get required data;
   b) driving a personal information detection module to trigger a subroutine for extracting the received data directly associated with personal information comprising user accounts or an email address book, so as to get required data; and
   c) driving an execution object detection module to trigger a subroutine for extracting the received data wherein the received data can facilitate launching a process in an operating system.

3. The data collection system according to claim 2, wherein the sensitive behavior detection module further implements website lists additionally for getting required data related to online survey on private questions; and the personal information detection module further implements a subroutine on monitoring header of sign-on or login protocols to facilitate extracting the received data directly associated with user accounts.

4. The data collection system according to claim 2, wherein the subroutine triggered by the personal information detection module comprises the following means:
   identifying a messenger ID;
   identifying an email address book;
   identifying an OS language;
   identifying an iris bio-information;
   identifying an IPv4 information;
   identifying a fin-transaction info;
   identifying a gene bio-info;
   identifying a fingerprint info;
   identifying a voiceprint info;
   identifying a face related info; and
   identifying a social media response info.

5. The data collection system according to claim 1, in order to remove risky data according to the user's configuration for high-level threats with specific cyber security risks, wherein the first-order risk filtering module performs filtering processes comprising:
   a) removing risky data associated with a web-aspect attacking behavior;
   b) removing risky data associated with an application external connection;
   c) removing risky data associated with a hosting service;
   d) removing risky data associated with a specific clouding service; and
   e) removing risky data associated with an ASP.Net web data.

6. The data collection system according to claim 1, in order to remove risky data and undesirable data according to the user's configuration for medium-level threats with specific system security issues, wherein the second-order risk filtering module performs filtering processes comprising:
   removing risky data associated with an ASP.Net java script for CPU targeted attack;
   removing risky data associated with a cross-platform attack;
   removing undesirable data associated with a bitcoin miner;
   removing undesirable data associated with a spam;
   removing risky data associated with an ID forgery attack;
   removing risky data associated with a protocol forgery attack;
   removing undesirable data associated with a geo-fencing information;
   removing undesirable data associated with an info-blocker behavior;
   removing undesirable data associated with a push notification;
   removing undesirable data associated with a suspicious virtual transaction;
   removing risky data associated with a social engineering;
   removing undesirable data associated with a full-paged web advertisement;
   removing undesirable data associated with a mobile pop-up web advertisement;
   removing undesirable data associated with a group-casting message; and
   removing risky data associated with a URL attached on the comment area of a social community.

7. The data collection system according to claim 1, wherein the data collection system further implements an operation to utilize a third-order risk filtering module which is connected to the second-order risk filtering module in sequence, to perform the following filtering processes for raw data related to data leaks occurred with wireless transmissions:
   a) driving a man-in-middle attack filter for removing risky data associated with packets used by a man-in-middle attack;
   b) driving a base-station forgery filter for removing risky data associated with packets sent by a base-station forgery; and
   c) driving a hotspot forgery filter for removing risky data associated with packets sent by a hotspot forgery.

8. The data collection system according to claim 1, in order to facilitate and enhance the data characterizing processes, wherein the data collection system further utilizes a visible data output module for performing the data characterizing processes comprising:
   a) classifying collected data in accordance with user's configuration to obtain a classified data;
   b) normalizing the classified data to reduce data redundancy, enhance data consistency, and derive a normalized data;
   c) performing data regression analysis on the normalized data to estimate a relationship between the outcome variable of the collected data and the features of the collected data for obtaining an analyzed data;
   d) providing visualization output for the analyzed data;
   e) performing principal component analysis (PCA) on the collected data so as to facilitate deriving predictive models;
   f) performing data clustering analysis on the collected data to determine whether there is a certain cluster distribution; and
   g) generating a report integrated with the collected data, the results of at least one of the above analyses, and the visualization output.

9. The data collection system according to claim 8, in order to facilitate classifying collected data, wherein the data characterizing processes further trigger a set of software logics as a data classifier for performing a data classification analysis according to user's configuration comprising the following options:
   a) analyzing with decision-tree models;
   b) analyzing with support vector machines; and
   c) analyzing with TDA (topological based data analysis) approaches utilizing Wasserstein Distance.

10. The data collection system according to claim 8, in order to facilitate reducing data redundancy, enhancing data consistency and deriving a normalized data, wherein the data characterizing processes further trigger a set of software logics as a data normalizer for performing a data normalization process to provide the following operations:
   a) tagging a representative label to the classified data and the data of the same class should be tagged with the same representative label;
   b) counting the probability of occurrence for each representative label; and
   c) dynamically setting up a data weight for each representative label based on its probability of occurrence.

11. The data collection system according to claim 8, in order to facilitate determining whether there is a certain cluster distribution with the collected data, wherein the data characterizing processes further trigger a set of software logics as a data clustering analyzer for performing the data clustering analysis comprising the following approaches:
   a) analyzing with k-means approaches;
   b) analyzing with quality-threshold-clustering approaches;
   c) analyzing with Fuzzy C-Means approaches; and
   d) performing a connectivity-based method for outlier analysis and a subspace clustering approach for data dimension reduction.

12. The data collection system according to claim 1, in order to facilitate and enhance the data characterizing processes, wherein the visible data output module based on a combination of processors, computer-readable storage medium, and sets of software logics further comprises:
   a data classifier which classifies collected data in accordance with user's configuration to obtain a classified data;
   a data normalizer which normalizes the classified data derived from the data classifier to reduce data redundancy, enhance data consistency, and derive a normalized data;
   a regression analyzer which performs data regression analysis on the normalized data derived from the data normalizer to estimate a relationship between the outcome variable of the collected data and the features of the collected data, so as to obtain an analyzed data;
   a visualization module to provide visualization output for the analyzed data obtained from the regression analyzer;
   a principal component analyzer which performs principal component analysis (PCA) on the collected data so as to facilitate deriving predictive models;
   a data clustering analyzer which performs data clustering analysis on the collected data to determine whether there is a certain cluster distribution; and
   an integrated report generator which generates a report integrated with the collected data, the results of at least one of the above analyses, and the visualization output.

13. A data collection system for effectively processing big data as a system device; wherein the system device comprises:
   a communication module;
   a processor;
   a computer-readable storage medium;
   an input module, and
   an output module;
      wherein the communication module is implemented by a communication circuit at least compliant with a serial port protocol and a wireless communication protocol;
      wherein the computer-readable storage medium is implemented by a non-volatile memory;
      wherein the input module is capable of receiving or setting an instruction to configure the data collection system;
      wherein the output module coupling to a display device is utilized to output an integrated report; and
      wherein the data collection system based on the implementation of the system device performs operations comprising;
         utilizing a first-order risk filtering module to receive a raw data including contents in types of text, image, video or executable scripts from remote sources and remove risky data according to a user's configuration for high-level threats with specific cyber security risks, wherein the remote sources comprise external websites and webpages on remote hosts;

utilizing a second-order risk filtering module to remove risky data and undesirable data according to a user's configuration for medium-level threats with specific system security issues;

utilizing a specific data extractor to get required data via performing data extracting processes on a received data;

utilizing a third-order risk filtering module to remove raw data related to man-in-middle behaviors; and utilizing the third-order risk filtering module to remove raw data related to data leaks;

wherein the first-order risk filtering module, the specific data extractor, the second-order risk filtering module and the third-order risk filtering module are connected in series, so as to obtain collected data for data characterizing processes, wherein the data characterizing processes include data clustering analysis and principal component analysis, thereby the data collection system outputs usable raw data without blocking data or a data stream.

14. The data collection system according to claim 13, in order to get required data, wherein the data extracting processes performed by the specific data extractor further comprise:

driving a sensitive behavior detection module to trigger a subroutine when finding some cookies received with a frequency higher than a configured threshold for extracting the received data directly associated with sensitive behavior, so as to get required data;

driving a personal information detection module to trigger a subroutine for extracting the received data directly associated with personal information comprising user accounts or an email address book, so as to get required data; and driving an execution object detection module to trigger a subroutine for extracting the received data wherein the received data can facilitate launching a process in an operating system.

15. The data collection system according to claim 14, wherein the sensitive behavior detection module further implements website lists additionally for getting required data related to online survey on private questions; and the personal information detection module further implements a subroutine on monitoring header of sign-on or login protocols to facilitate extracting the received data directly associated with user accounts.

16. The data collection system according to claim 14, in order to get required data directly associated with personal information, wherein the subroutine triggered by the personal information detection module comprises the following means:

identifying a messenger ID;
identifying an email address book;
identifying an OS language;
identifying an iris bio-information;
identifying an IPv4 information;
identifying a fin-transaction info;
identifying a gene bio-info;
identifying a fingerprint info;
identifying a voiceprint info;
identifying a face related info; and
identifying a social media response info.

17. The data collection system according to claim 13, in order to remove risky data according to the user's configuration for high-level threats with specific cyber security risks, wherein the first-order risk filtering module performs filtering processes comprising:

a) removing risky data associated with a web-aspect attacking behavior;
b) removing risky data associated with an application external connection;
c) removing risky data associated with a hosting service;
d) removing risky data associated with a specific clouding service; and
e) removing risky data associated with an ASP.Net web data.

18. The data collection system according to claim 13, in order to remove risky data and undesirable data according to the user's configuration for medium-level threats with specific system security issues, wherein the second-order risk filtering module performs filtering processes comprising:

removing risky data associated with an ASP.Net java script for CPU targeted attack;
removing risky data associated with a cross-platform attack;
removing undesirable data associated with a crypto miner;
removing undesirable data associated with a spam;
removing risky data associated with an ID forgery attack;
removing risky data associated with a protocol forgery attack;
removing undesirable data associated with a geo-fencing information;
removing undesirable data associated with an info-blocker behavior;
removing undesirable data associated with a push notification;
removing undesirable data associated with a suspicious virtual transaction;
removing risky data associated with a social engineering;
removing undesirable data associated with a full-paged web advertisement;
removing undesirable data associated with a mobile pop-up web advertisement;
removing undesirable data associated with a group-casting message; and
removing risky data associated with a URL attached on the comment area of a social community.

19. The data collection system according to claim 13, wherein the data collection system further implements an operation to utilize a third-order risk filtering module which is connected to the second-order risk filtering module in sequence, to perform the following filtering processes for raw data related to data leaks occurred with wireless transmissions:

a) driving a man-in-middle attack filter for removing risky data associated with packets used by a man-in-middle attack;
b) driving a base-station forgery filter for removing risky data associated with packets sent by a base-station forgery; and
c) driving a hotspot forgery filter for removing risky data associated with packets sent by a hotspot forgery.

20. The data collection system according to claim 13, in order to facilitate and enhance the data characterizing processes on the collected data, wherein the data collection system further utilizes a visible data output module for performing the data characterizing processes in steps comprising:

classifying collected data in accordance with user's configuration to obtain a classified data;
normalizing the classified data to reduce data redundancy, enhance data consistency, and derive a normalized data;

performing data regression analysis on the normalized data to estimate a relationship between the outcome variable of the collected data and the features of the collected data for obtaining an analyzed data;

providing visualization output for the analyzed data;

performing principal component analysis (PCA) on the collected data so as to facilitate deriving predictive models;

performing data clustering analysis on the collected data to determine whether there is a certain cluster distribution; and generating a report integrated with the collected data, the results of at least one of the above analyses, and the visualization output.

21. The data collection system according to claim 20, in order to facilitate classifying collected data, wherein the data characterizing processes further trigger a set of software logics as a data classifier for performing a data classification analysis according to user's configuration comprising the following options:

analyzing with decision-tree models;

analyzing with support vector machines; and analyzing with TDA (topological based data analysis) approaches utilizing Wasserstein Distance.

22. The data collection system according to claim 20, in order to facilitate reducing data redundancy, enhancing data consistency and deriving a normalized data, wherein the data characterizing processes further trigger a set of software logics as a data normalizer for performing a data normalization process to provide the following operations:

tagging a representative label to the classified data and the data of the same class should be tagged with the same representative label;

counting the probability of occurrence for each representative label; and dynamically setting up a data weight for each representative label based on its probability of occurrence.

23. The data collection system according to claim 20, in order to facilitate determining whether there is a certain cluster distribution with the collected data, wherein the data characterizing processes further trigger a set of software logics as a data clustering analyzer for performing the data clustering analysis comprising the following approaches:

analyzing with k-means approaches;

analyzing with quality-threshold-clustering approaches;

analyzing with Fuzzy C-Means approaches; and performing a connectivity-based method for outlier analysis and a subspace clustering approach for data dimension reduction.

* * * * *